United States Patent [19]

Kallman

[11] Patent Number: 4,523,113

[45] Date of Patent: Jun. 11, 1985

[54] MAGNETOHYDRODYNAMIC GENERATOR SYSTEM

[75] Inventor: William R. Kallman, Portland, Oreg.

[73] Assignee: Martin Reid Johnson, Austin, Tex.; a part interest

[21] Appl. No.: 488,256

[22] Filed: Apr. 25, 1983

[51] Int. Cl.³ ............................................. H02K 45/00
[52] U.S. Cl. ........................................................ 310/11
[58] Field of Search ......................... 310/11; 60/641.8; 322/2

[56] References Cited

U.S. PATENT DOCUMENTS

| 659,450 | 10/1900 | McHenry | 60/641.8 |
|---|---|---|---|
| 3,294,989 | 12/1966 | Eichenberger | 310/11 |
| 3,405,291 | 10/1968 | Brandmaier | 310/11 X |
| 3,524,086 | 8/1970 | Lindley | 310/11 |
| 3,636,389 | 1/1972 | Petrick | 310/11 |
| 3,705,317 | 12/1972 | Prem | 310/11 |
| 3,708,704 | 1/1973 | Zauderer | 310/11 |
| 3,873,860 | 3/1975 | Bergman et al. | 310/11 |
| 4,191,901 | 3/1980 | Branover | 310/11 |
| 4,269,637 | 5/1981 | Flanagan | 310/11 X |
| 4,381,463 | 4/1983 | Branover | 310/11 |

Primary Examiner—Donovan F. Duggan
Attorney, Agent, or Firm—Kolisch, Hartwell & Dickinson

[57] ABSTRACT

A method of generating electricity wherein a solution of liquid ammonia and an element which dissolves and ionizes in such liquid ammonia is moved through a magnetohydrodynamic generator.

8 Claims, 3 Drawing Figures

MAGNETOHYDRODYNAMIC GENERATOR SYSTEM

BACKGROUND AND SUMMARY OF THE INVENTION

This invention relates to the production of electrical energy by means of a magnetohydrodynamic generator and, more particularly, to a method and system for so producing electrical energy which is well adapted to be powered utilizing heat sources at relatively low temperature levels. Thus, the invention is particularly suited for being powered utilizing solar energy which provides heat, but ordinarily at a lower temperature level.

Magnetohydrodynamic generators are not new. However, operation of such generators, as such has been proposed in the past, has been accompanied with a number of disadvantages and problems. For instance, it has been proposed to utilize as the operating fluid in such a generator an ionized gas or plasma operating at extremely high temperatures, for example, 3000° C., and with the operating temperatures obtained using coal or gasfired heat sources. In addition to the disadvantage of requiring costly energy sources to operate, such systems present corrosion problems and other difficulties by reason of the high temperatures employed. In a magnetohydrodynamic generator system wherein a liquid metal is accelerated through the generator to produce electrical energy, again relatively high temperatures are needed to reduce the more common metals to liquid form and, because the usual liquid metal is quite dense and relatively viscous, power losses are encountered in circulating the metal through the system. More recently, and as disclosed in U.S. Pat. No. 4,191,901, a system has been proposed which utilizes vapors formed by volatilizing an organic liquid, such as Freon, to propel a liquid alloy, such as a liquid sodium potassium alloy, through a magnetohydrodynamic generator. Among the disadvantages which characterize this type of system are the relatively viscous nature of the alloy and power losses that result on propelling such through the generator, the explosive nature of the alloy in the presence of moisture and attendant safety problems, and the fact that the fluid medium passing through the generator is actually a two-phase system comprising the metal alloy liquid and the propelling vaporized Freon gas. The gas in such fluid medium lowers the electrical conductivity of the medium which is passing through the generator and again reduces power output. Additionally, the two phases in the medium, i.e. the gas and the liquid alloy, must be separated on leaving the generator, introducing problems attendant to such separation and the return of such materials prior to recycling through the generator.

Contemplated by the present invention is a magnetohydrodynamic generator system which utilizes a liquid ammonia solution as the medium circulated through the generator, with such medium rendered conductive through the presence in the liquid ammonia of a dissolved element or elements which dissolve and ionize in liquid ammonia to produce cations of the element or elements and electrons which are solvated by the ammonia. The liquid ammonia solution which passes through the generator is what might be thought of as a single phase liquid in the sense that there is not present a mixture of two basically immiscible materials, as disclosed in the above-identified U.S. patent. The medium circulated through the generator possesses excellent electrical and thermal conductivity, relatively low viscosity and relatively low density (as compared, for instance, to a liquid metal), all contributing to efficient production of power when the medium passes through the generator. The solutions contemplated are obtainable at relative low cost. Problems of separation of immiscible materials, as presented in the process of the above patent, are eliminated.

As contemplated in a preferred embodiment of the invention, the liquid ammonia solution, on being returned for recycling through the generator, is pressurized to a pressure at or above the critical pressure of the solution which, for a concentrated lithium ammonia solution, is approximately 1600 psi. The solution may then be heated to its critical temperature, or a temperature near the critical temperature of the solution (which, for the lithium ammonia solution just described, is approximately 200° C.), to produce a sub or super critical fluid of the solution, and a lowering in the density of the solution (by reason of expansion of the solution). It is this expansion of the solution which produces movement of the solution at high velocity through the generator, with attendant production of electrical energy. On being discharged from the generator, the solution may be cooled with a concommitant increase in density, repressurized, heated and recirculated through the generator.

As will be apparent for the above broadly described embodiment of the invention, heating to produce operation of the generator as contemplated herein may be performed at relatively low temperatures. This adapts the system of the invention for being practiced efficiently using relatively low temperature heat sources, such as solar heat, geothermal heat, waste heat, etc.

These and other objects and advantages are attained by the invention, which will be described more fully herein below, wherein.

DETAILED DESCRIPTION OF THE INVENTION

Figure 1:
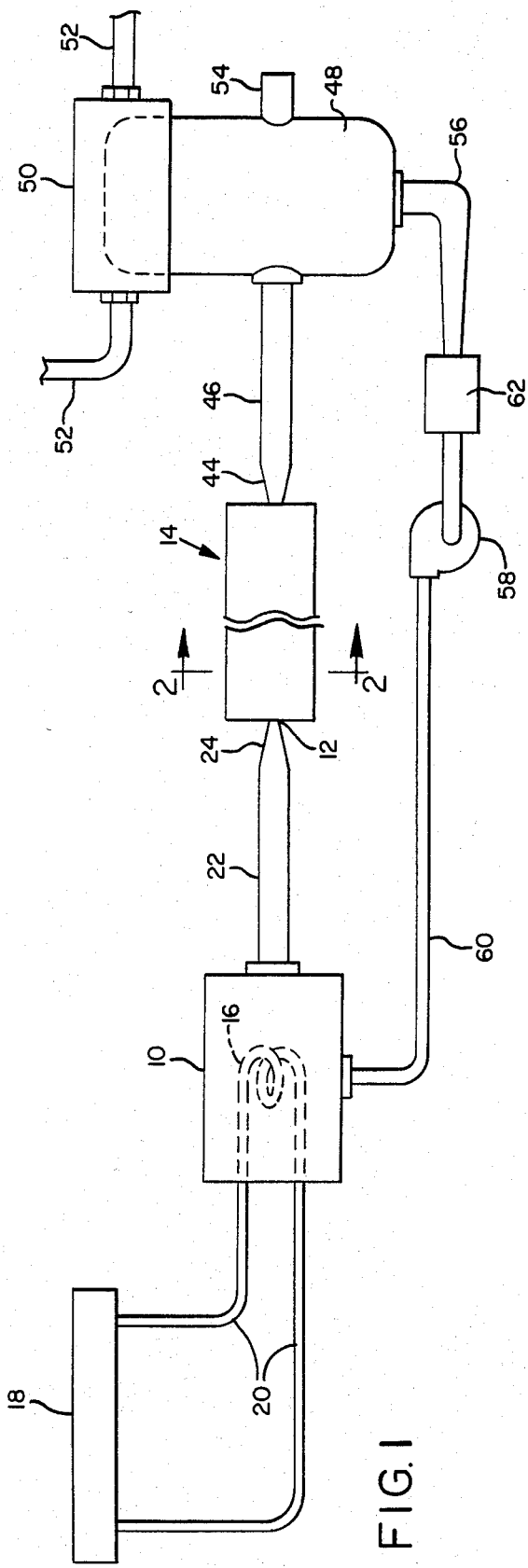
FIG. 1 is a view in simplified form illustrating apparatus visible in practicing the invention contemplated herein.

Describing the invention in more detail, ammonia, when liquified (liquification of ammonia at room temperature occurring approximately at a pressure of 100 psi), exhibits the ability to dissolve certain elements, with the element ionizing in the liquid ammonia to produce cations of the element and electrons which are solvated by the ammonia. Excluding such rare metals as rubidium and terbium, elements of this description principally include the alkali metals lithium, sodium, potassium and cesium, the alkaline earths calcium, strontium, and barium, and the rare earth ytterbium.

In the following table, solutions of these elements are listed, and indicated in the table is the approximate mole percent of the respective elements which is dissolvable in liquid ammonia to produce a concentrated solution of the element.

| Solution | Dissolved Elements Mole % |
|---|---|
| Li—NH$_3$ | 21.5 |
| Na—NH$_3$ | 17 |
| K—NH$_3$ | 15 |
| CS—NH$_3$ | 16 |
| Ca—NH$_3$ | 13.3 |
| Sr—NH$_3$ | 13.3 |
| Ba | 13.5 |
| Yb | 14.3 |

Ammonia solutions of the above-indicated elements have a number of desirable properties rendering them suitable for the practicing of the present invention. The solutions are thermally conductive and exhibit excellent electrical conductivity. By way of example, the electrical conductivity of a concentrated liquid ammonia and lithium solution is in the order of 15,000$\Omega^{-1}$cm$^{-1}$, or approximately 1½ times that of mercury, and nearly approximates the conductivity of pure sodium potassium alloy. Furthermore, these conductivities are increased with the solution placed in the state of, or in nearly the state of, a super critical fluid, which occurs in the case of a concentrated solution of lithium at a pressure of approximately 1600 psi and a temperature of approximately 200° C. Conductivities are also increased in the presence of high electrical fields owing to the Wien effect.

In the production of power in a magnetohydrodynamic generator, the power produced is directly proportional to the electrical conductivity of the medium flowing through the generator, and the square of the velocity of the flow of such medium through the generator. The excellent electrical conductivities of the solutions herein contemplated make them obviously advantageous as mediums for use with the generator. The relatively low viscosity shared by the solutions, and the fact that the solutions have densities which are substantially below the densities of materials such as mercury or sodium potassium alloy, means that the solutions may be circulated through a generator system with less energy required to produce such movement and the desired velocity through the generator.

Of the elements listed in the above table, it is contemplated that solutions of lithium, sodium and potassium are the preferred solutions utilized in the invention. In addition to other properties rendering them optimum for use, these alkali metals are relatively readily available.

In practicing the invention, the liquid ammonia solution may be collected in a chamber or vessel in a pressurized state. The solution may be heated to raise the temperature of the solution to a temperature which is approximate the critical temperature of the solution, to place the solution at or near the state of being a super critical fluid. This produces an expansion of the solution (a concentrated solution of lithium and ammonia exhibiting substantially a five-fold increase in volume on being raised in temperature from room temperature to the critical temperature of 200° C.). The heat-induced expansion of the solution propels the solution at high velocity through the magnetohydrodynamic generator. Liquid expelled from the generator is collected at a lower pressure, cooled and returned under pressure to the chamber where heating occurs.

Figure 2:
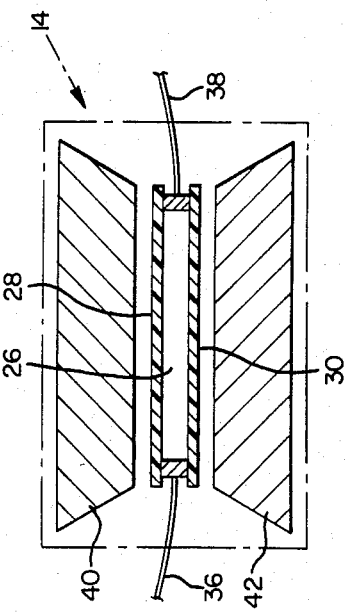
FIG. 2 is a cross sectional view, taken generally along a line 2—2 in FIG. 1.

Apparatus such as may be employed in practicing the invention is illustrated in FIGS. 1 and 2. Referring to these figures, a chamber or reservoir is shown at 10, adapted to hold a volume of liquid ammonia solution under pressure prior to such being introduced to the inlet 12 of a magnetohydrodynamic generator 14. The contents of reservoir 10 is heated by means of a heating coil 16 located within the reservoir suppliied with a heating liquid circulated through the coil by an external heating source.

In this embodiment of the invention illustrated, this external heating source may be a solar heat absorber or heater, indicated generally at 18, constructed to collect the heat of the sun and transfer such heat to liquid circulated within the heater. Such liquid, in turn, is channelled to and from heating coil 16 through conduits 20.

The ammonia solution travels out of reservoir 10 through a conduit 22 terminating in a constricted or nozzle section 24 which communicates with inlet 12 of the magnetohydrodynamic generator.

The generator, which is illustrated in simplified form in FIGS. 1 and 2, includes one or more elongate channels, such as channel 26, extending therethrough. As illustrated in FIG. 2, such has a rectangular cross section. Top and bottom sides of the channel are bounded by walls 28, 30 of an insulating material. Opposed upstanding side walls 32, 34 are electrically conductive, constituting electrodes in the generator. These electrodes are connected to output leads 36, 38. The channel described is located in the gap between poles 40, 42 of a magnet. Continuous electrodes are shown, but others may be used such as Hall, segmented or induction.

Ammonia solution exiting from the generator travels through an expanding conduit section 44 and conduit 46 into a receiving reservoir or chamber 48.

Reservoir 48 may be provided with a water cooling jacket 50 which encompasses the upper end of the reservoir. Water is circulated through this jacket through conduits 52, 54. If desired, additional cooling means (not shown) may be provided internally of the reservoir for further cooling the reservoir's contents. The water cooling jacket and such additional cooling means serve to condense any ammonia vapor within the reservoir and to cool the liquid contents of the reservoir to a temperature well below the critical temperature of the ammonia solution.

With some alkali metal liquid ammonia solutions, as, for example, solutions of lithium and liquid ammonia, over a period of time some slight decomposition of the solution may occur with the production of a metal amide and hydrogen. Thus, if desired, a hydrogen gas recovery unit 54 or recombination unit may be provided joining with the receiving reservoir and operable to remove hydrogen thus formed.

Liquid ammonia solution is returned to reservoir 10 by way of conduit 56, pump 58 and conduit 60. With operation of the pump, the solution is returned to reservoir 10 at the pressure maintained within the reservoir.

Conduit 56 may, if desired, have included between its ends a filter 62 for removing any amide produced by the decomposition reaction discussed above.

Describing the operation of the apparatus, as such may be used in practicing the invention, a lithium ammonia solution (20 mole percent lithium) is collected in reservoir 10 at a pressure of approximately 1700 psi (a pressure slightly above the critical pressure of the solution). The solution is heated through operation of solar heater 18 to a temperature of 200° C. (a temperature near the critical temperature of the solution). The solution within the reservoir therefore is near the state of a super critical fluid.

The super critical fluid mentioned leaves reservoir 10 through conduit 22 and nozzle section 24 to pass at high velocity through the constricted passage offered by the channel extending through the magnetohydrodynamic generator. Fluid leaving the generator is collected in reservoir 48, where such is cooled to typically about room temperature, or 25° C. The pressure within reservoir 48 is subject to some variation depending upon the pressure drop which occurs on the solution passing through the generator, but typically might approximate 100 psi.

Fluid collected in the receiving reservoir is returned to reservoir 10 through operation of pump 58. The solution, in its cooled state, has a density of approximately 0.5 grams per cubic centimeter, or approximately 5 times the density of the solution when existing as a super critical fluid.

On being returned the reservoir 10 and mixing with the contents of this reservoir, the solution is raised in temperature to the equilibrium temperature existing in the reservoir, i.e. 200° C., to reestablish the solution as a near super critical fluid.

The invention as described above utilizes a concentrated solution of lithium in liquid ammonia. More dilute solutions might be employed, such as, for example, solutions of 10 mole percent lithium. Use of less concentrated solutions results in a lowering of the critical temperature of the solution, and thus the temperature to be established in reservoir 10, to obtain a super critical fluid from the solution.

With lowering of the concentration of the lithium in the lithium ammonia solution, the solution becomes somewhat less stable, in the sense that ammonia tends to vaporize from the solution in reservoir 48. This requires that a pressure be maintained in reservoir 48 sufficient to cause condensing of this ammonia by the water jacket 50 whereby such returns to the solution.

Figure 3:
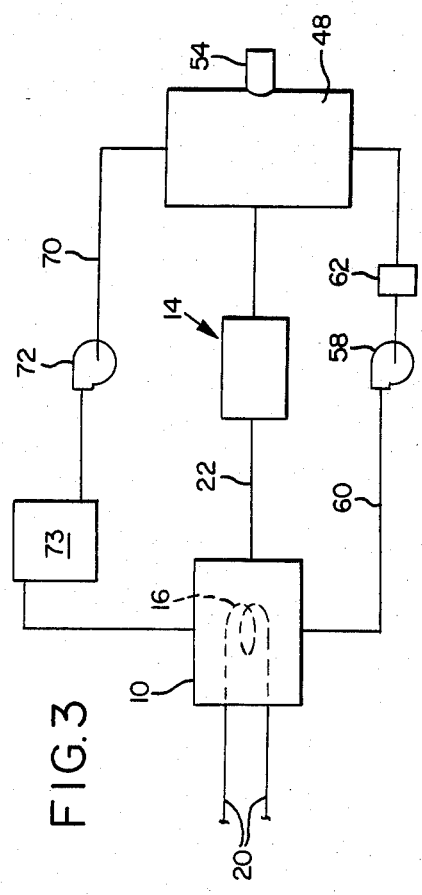
FIG. 3 is a simplified diagramatic view, illustrating a modification of the invention.

FIG. 3 illustrates a modified form of the invention in block diagram form. In FIG. 3, components which have been discussed in connection with FIGS. 1 and 2, and which also appear in the modification shown in FIG. 3 in block form, have been given the same reference numerals as in FIG. 1. The essential difference in the form of the invention shown in FIG. 3 is that a conduit 70 is provided extending from the top of reservoir 48 which connects with the top of reservoir 10. The conduit is provided intermediate its ends with a pump 72. The conduit and pump provide a means for recirculating gaseous ammonia in reservoir 48 back to reservoir 10. The ammonia is condensed by being pressurized to approximately 100 psi by pump 72 to be condensed by condenser 73 at room temperature. With return of liquid ammonia to reservoir 10, a volume increase is experienced on such mixing with the molten contents of reservoir 10. This expansion results from the additional space taken up by the newly solvated electrons and metal cations, and also from the thermal increase in volume which occurs on mixing of hot molten metal with the ammonia. This volume increase may further be relied upon to produce movement of the ammonia solution through the magnetohydrodynamic generator.

Summarizing some of the advantages which occur by the invention, the ammonia solutions utilized are characterized by relatively low densities contributing to efficiency in moving the solutions through the equipment. The solutions have high conductivities, rendering them efficient electricity producers. The solutions have low viscosities, minimizing drag on the solutions moving through the equipment. The conductive medium passing through the generator is completely miscible and devoid of dispersed propellent gas of low conductivity, as in the system of U.S. Pat. No. 4,191,901. Also eliminated are the problems of separating and recirculating the mutually immiscible materials which are channelled through the generator according to this patent. The system of the invention may be operated with widely varying temperatures and pressures, dependent upon the type of solution employed and the mole ratio of the element which provides the solvated electrons in the solution.

It is claimed and desired to secure by Letters Patent:

1. A method of generating electricity which comprises:

preparing a solution of liquid ammonia and an element which dissolves and ionizes in such liquid ammonia to produce cations of the element and electrons which are solvated by the ammonia, and moving said solution containing such solvated electrons through a magnetohydrodynamic generator.

2. The method of claim 1, which comprises pressurizing the solution and heating the solution to produce expansion of the solution, and said expansion of the solution produces movement of the solution through the magnetohydrodynamic generator.

3. The method of claim 1, wherein the solution containing the solvated electrons is moved through a magnetohydrodynamic generator with motion produced at least partially by reason of volume expansion occurring on the mixing of ammonia with molten metal.

4. The method of claim 1, wherein the solution is circulated through the generator with the solution flowing from an upstream side of the generator through the generator to a downstream side of the generator thence to be recirculated to the upstream side of the generator, solution is collected at one temperature and pressure on the downstream side of the generator, and the collected solution is recirculated to the upstream side of the generator after being pressurized and heated to produce expansion of the solution causing movement through the generator.

5. The method of claim 1, wherein the solution is a concentrated solution of an alkali metal.

6. The method of claim 1, wherein the solution is a solution of an alkali metal, the solution is circulated through the generator with the solution flowing from an upstream side of the generator through the generator to a downstream side of the generator thence to be recirculated to the upstream side of the generator, the solution is collected at one temperature and pressure on the downstream side of the generator, and the collected solution is recirculated to the upstream side of the generator after being pressurized and heated to produce expansion of the solution which produces movement through the generator.

7. A method of generating electricity, wherein a concentrated solution of an alkali metal in liquid ammonia is circulated through a magnetohydrodynamic generator, the alkali metal dissolving and ionizing in such liquid ammonia to produce cations of the alkali metal and electrons which are solvated by the ammonia, the ammonia solution flowing from an upstream side of the magnetohydrodynamic generator through the generator to the downstream side of the generator, and thence being recirculated to the upstream side of the generator, the solution being collected at one temperature and pressure on the downstream side of generator and the collected solution, on being recirculated to the upstream side of the generator, being pressurized, and then heated, to produce, as a result of such heating, expansion of the solution, said expansion of the solution producing movement of the solution through the generator.

8. A method of producing electricity utilizing solar energy and by means of a magnetohydrodynamic generator which comprises:

collecting within a collecting chamber a solution of liquid ammonia and an alkali metal, with the alkali metal having dissolved and ionized in such liquid ammonia to produce cations of the alkali metal and electrons which are solvated by the ammonia, heating said solution in said chamber to produce expansion of said solution, directing said solution on such expansion through a magnetohydrodynamic generator, collecting the solution at a lower temperature and pressure after such has passed through the magnetohydrodynamic generator, and with pumping and pressurizing of the solution, returning the solution to said chamber.

* * * * *